United States Patent
Pasad et al.

(10) Patent No.: US 12,004,070 B2
(45) Date of Patent: Jun. 4, 2024

(54) DL BACKHAUL CONTROL CHANNEL DESIGN FOR RELAYS

(71) Applicant: INTERDIGITAL TECHNOLOGY CORPORATION, Wilmington, DE (US)

(72) Inventors: Kalpendu R. Pasad, Cupertino, CA (US); Sung-Hyuk Shin, Northvale, NJ (US); Mihaela C. Beluri, Jericho, NY (US); Marian Rudolf, Montreal (CA); Pascal M. Adjakple, Great Neck, NY (US); John W. Haim, Baldwin, NY (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 0 days.

(21) Appl. No.: 17/885,629

(22) Filed: Aug. 11, 2022

(65) Prior Publication Data

US 2022/0386218 A1 Dec. 1, 2022

Related U.S. Application Data

(63) Continuation of application No. 16/851,461, filed on Apr. 17, 2020, now Pat. No. 11,419,036, which is a
(Continued)

(51) Int. Cl.
*H04W 40/22* (2009.01)
*H04B 7/155* (2006.01)
(Continued)

(52) U.S. Cl.
CPC ............ *H04W 40/22* (2013.01); *H04B 7/155* (2013.01); *H04L 5/0053* (2013.01);
(Continued)

(58) Field of Classification Search
CPC .... H04W 72/23; H04W 72/20; H04L 5/0053; H04L 5/0094
See application file for complete search history.

(56) References Cited

U.S. PATENT DOCUMENTS 7,924,755 B2  4/2011  Xu et al.
8,027,297 B2  9/2011  Kim et al.
(Continued)

FOREIGN PATENT DOCUMENTS

CN      1956354 A      5/2007
CN    101322330 A     12/2008
(Continued)

OTHER PUBLICATIONS

3rd Generation Partnership Project (3GPP), R1-072097, "E-UTRA Downlink CCE to RE Mapping Scheme", Huawei, 3GPP TSG-RAN-WG1 Meeting #49, Kobe, Japan, May 7-11, 2007, 3 pages.
(Continued)

*Primary Examiner* — Chandrahas B Patel
(74) *Attorney, Agent, or Firm* — CONDO ROCCIA KOPTIW LLP

(57) ABSTRACT

Methods and apparatus are described for providing compatible mapping for backhaul control channels, frequency first mapping of control channel elements (CCEs) to avoid relay-physical control format indicator channel (R-PCFICH) and a tree based relay resource allocation to minimize the resource allocation, map bits. Methods and apparatus (e.g., relay node (RN)/evolved Node-B (eNB)) for mapping of the Un downlink (DL) control signals, Un DL positive acknowledgement (ACK)/negative acknowledgement (NACK), and/or relay-physical downlink control channel (R-PDCCH) (or similar) in the eNB to RN (Un interface) DL direction are described. This includes time/frequency mapping of above-mentioned control signals into resource blocks (RBs) of multimedia broadcast multicast services (MBMS) single
(Continued)

frequency network (MBSFN)-reserved sub-frames in the RN cell and encoding procedures for these. Also described are methods and apparatus for optimizing signaling overheads by avoiding R-PCFICH and minimizing bits needs for resource allocation.

16 Claims, 14 Drawing Sheets

Related U.S. Application Data continuation of application No. 15/636,823, filed on Jun. 29, 2017, now Pat. No. 10,660,011, which is a continuation of application No. 14/621,724, filed on Feb. 13, 2015, now Pat. No. 9,756,550, which is a continuation of application No. 12/855,331, filed on Aug. 12, 2010, now Pat. No. 8,976,806.

(60) Provisional application No. 61/256,159, filed on Oct. 29, 2009, provisional application No. 61/234,124, filed on Aug. 14, 2009.

(51) Int. Cl.
| | |
|---|---|
| H04L 5/00 | (2006.01) |
| H04W 72/04 | (2023.01) |
| H04W 72/20 | (2023.01) |
| H04W 72/23 | (2023.01) |
| H04W 88/04 | (2009.01) |
| H04W 84/04 | (2009.01) |

(52) U.S. Cl.
CPC .......... *H04L 5/0094* (2013.01); *H04W 72/23* (2023.01); *H04W 88/04* (2013.01); *H04W 72/04* (2013.01); *H04W 72/20* (2023.01); *H04W 84/047* (2013.01)

(56) References Cited

U.S. PATENT DOCUMENTS

| | | | |
|---|---|---|---|
| 8,107,547 B2 | 1/2012 | Muharemovic et al. | |
| 8,155,070 B2 | 4/2012 | Lee et al. | |
| 8,537,724 B2 | 9/2013 | Love et al. | |
| 9,014,073 B2 | 4/2015 | Park et al. | |
| 9,048,924 B2 | 6/2015 | Chung et al. | |
| 9,252,867 B2 | 2/2016 | Park et al. | |
| 9,344,259 B2 * | 5/2016 | Love | H04L 5/003 |
| 9,462,564 B2 * | 10/2016 | Dalsgaard | H04B 7/2681 |
| 9,496,950 B2 | 11/2016 | Park et al. | |
| 9,839,001 B2 | 12/2017 | Choi | |
| 9,853,793 B2 | 12/2017 | Lee et al. | |
| 2005/0073978 A1 | 4/2005 | Kim et al. | |
| 2007/0098102 A1 | 5/2007 | Hottinen | |
| 2009/0097447 A1 | 4/2009 | Han et al. | |
| 2009/0197631 A1 | 8/2009 | Palanki et al. | |

FOREIGN PATENT DOCUMENTS

| | | |
|---|---|---|
| CN | 102265530 A | 11/2011 |
| GB | 2469689 A | 10/2010 |
| JP | 2009-521825 A | 6/2009 |
| JP | 2012-520620 A | 9/2012 |
| JP | 2012-521665 A | 9/2012 |
| WO | 2007/069848 A2 | 6/2007 |
| WO | 2010/074536 A2 | 7/2010 |
| WO | 2010/105098 A1 | 9/2010 |

OTHER PUBLICATIONS

3rd Generation Partnership Project (3GPP), R1-072612, "Way Forward on CCE-to-RE Mapping", Ericsson, Motorola, Samsung, Nokia, Nokia-Siemens Networks, Mitsubishi, Alcatel-Lucent, Texas Instruments, Nortel, NTT DoComo, Huawei, Qualcomm, Panasonic, LG Electronics, May 14, 2007, pp. 1-4.
3rd Generation Partnership Project (3GPP), R1-073510, "CCE to RE Interleaver Design Criteria", Huawei, TSG RAN WG1 Meeting #50, Athens, Greece, Aug. 20-24, 2007, 7 pages.
3rd Generation Partnership Project (3GPP), R1-081007, "DL Control Signaling for DVRB Allocation Using Compact Assignment", LG Electronics, 3GPP TSG RAN WG1 #52, Sorrento, Italy, Feb. 11-15, 2008, pp. 1-4.
3rd Generation Partnership Project (3GPP), R1-091151, "Relay Link Control Signalling", Research in Motion, UK Limited, 3GPP TSG RAN WG1 Meeting #56bis, Seoul, Korea, Mar. 23-27, 2009, pp. 1-5.
3rd Generation Partnership Project (3GPP), R1-091194, "Resource Allocation and Downlink Control Channel Structure for Relay Backhaul Link", LG Electronics, 3GPP TSG RAN WG1 Meeting #56bis, Seoul, Korea, Mar. 23-27, 2009, 7 pages.
3rd Generation Partnership Project (3GPP), R1-091348, "Frame Structure and Signaling to Support Relay Operation", Motorola, 3GPP TSG RAN1 #56bis, Seoul, South Korea, Mar. 23-27, 2009, 3 pages.
3rd Generation Partnership Project (3GPP), R1-091689, "MBSFN Subframe and Control Structure for Relay Type 1 Nodes", NEC Group, TSG-RAN WG1#57, San Francisco, CA, US, May 4-8, 2009, pp. 1-5.
3rd Generation Partnership Project (3GPP), R1-092115, "Resource Allocation and Downlink Control Channel Structure for Relay Backhaul Link", LG Electronics, TSG RAN WG1 Meeting #57, San Francisco, USA, May 4-8, 2009, 7 pages.
3rd Generation Partnership Project (3GPP), R1-092249, "Text Proposal on Backhaul Resource Assignment", Nokia, Nokia Siemens Networks, Ericsson, Motorola, RIM, TI, NEC, Samsung, Huawei, CATT, LGE, CMCC, Qualcomm, ZTE, 3GPP TSG RAN WG1 Meeting #57, San Francisco, USA, May 4-8, 2009, 1 page.
3rd Generation Partnership Project (3GPP), R1-092375, "Considerations on R-PDCCH for Type 1 Relays", Huawei, 3GPP TSG RAN WG1 Meeting #57bis, Los Angeles, USA, Jun. 29-Jul. 3, 2009, 4 pages.
3rd Generation Partnership Project (3GPP), R1-092468, "Control Channel of Backhaul Link", ZTE, TSG-RAN WG1 #57bis, Los Angeles, US, Jun. 29-Jul. 3, 2009, 7 pages.
3rd Generation Partnership Project (3GPP), R1-092565, "Further Aspects of Control Channel for Relay Backhaul link", Nokia Siemens Networks, Nokia, 3GPP TSG RAN WG1 Meeting #57bis, Los Angeles, US, Jun. 29-Jul. 3, 2009, 3 pages.
3rd Generation Partnership Project (3GPP), R1-092638, "Relay Backhaul Design", Motorola, 3GPP TSG RAN WG1 Meeting #57bis, Los Angeles, USA, Jun. 29-Jul. 4, 2009, pp. 1-3.
3rd Generation Partnership Project (3GPP), R1-092660, "Some Considerations on Downlink Backhaul Control Design in Type I Relay", Samsung, 3GPP TSG RAN WG1 Meeting #57bis, Los Angeles, USA, Jun. 29-Jul. 3, 2009, pp. 1-5.
3rd Generation Partnership Project (3GPP), R1-092702, "Backhaul Link Design in Support of Relaying Operation", Qualcomm Europe, 3GPP TSG-RAN WG1 #57bis, Los Angeles, USA, Jun. 29-Jul. 3, 2009, pp. 1-3.
3rd Generation Partnership Project (3GPP), R1-092780, "Draft Text Proposal on Type I Relay UL Backhaul Subframes in LTE-A", Catt, CMCC, Huawei, ITRI, LGE, Motorola, Nokia, Nokia Siemens Networks, Potevio, Qualcomm, RITT, Samsung, Texas Instruments, ZTE, 3GPP TSG RAN WG1 #57-bis, Jun. 29-Jul. 3, 2009, 1 page.
3rd Generation Partnership Project (3GPP), R1-092781, "Design of Backhaul Control Channel for Type I Relay in LTE-A", CATT, 3GPP TSG RAN WG1 #57bis, Los Angeles, USA, Jun. 29-Jul. 3, 2009, 3 pages.
3rd Generation Partnership Project (3GPP), R1-092965, "Control Structure for Relay Type 1 Nodes", NEC Group, TSG-RAN WG1#57Bis, Los Angeles, CA, USA, Jun. 29-Jul. 3, 2009, pp. 1-5.
3rd Generation Partnership Project (3GPP), R1-100289, "Link-Level Results for R-PDCCH Multiplexing Using FDM and TDM+

(56) References Cited

OTHER PUBLICATIONS

FDM", InterDigital Communications, LLC, 3GPP TSG-RAN WG1 Meeting #59bis, Valencia, Spain, Jan. 18-22, 2010, pp. 1-8.
3rd Generation Partnership Project (3GPP), R1-101532, "Link-Level Results for R-PDCCH Multiplexing Using FDM and TDM+FDM", InterDigital Communications, LLC, 3GPP TSG-RAN WG1 Meeting #60, San Francisco, CA, USA, Feb. 22-26, 2010, pp. 1-8.
3rd Generation Partnership Project (3GPP), R2-094025, "FDD Relay Type I Backhaul Interference and HARQ Issues", InterDigital, 3GPP TSG-RAN WG2 Meeting #66bis, Los Angeles, CA, USA, Jun. 29-Jul. 3, 2009, 5 pages.
3rd Generation Partnership Project (3GPP), TS 36.211 V8.6.0, "Technical Specification Group Radio Access Network, Evolved Universal Terrestrial Radio Access (E-UTRA), Physical Channels and Modulation (Release 8)", Mar. 2009, pp. 1-82.
3rd Generation Partnership Project (3GPP), TS 36.211 V8.7.0, "Technical Specification Group Radio Access Network, Evolved Universal Terrestrial Radio Access (E-UTRA), Physical Channels and Modulation (Release 8)", May 2009, 88 pages.
3rd Generation Partnership Project (3GPP), TS 36.213 V8.6.0, "Technical Specification Group Radio Access Network, Evolved Universal Terrestrial Radio Access (E-UTRA), Physical Layer Procedures (Release 8)", Mar. 2009, pp. 1-77.
3rd Generation Partnership Project (3GPP), TS 36.213 V8.7.0, "Technical Specification Group Radio Access Network, Evolved Universal Terrestrial Radio Access (E-UTRA), Physical Layer Procedures (Release 8)", May 2009, pp. 1-77.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
CNIPA, "National Intellectual Property Administration, PRC for Reexamination and Invalidation Examination", Examination Decision on Request for Invalidation (No. 43790) of Chinese Patent Application No. ZL 201510418989.2, dated Apr. 2, 2020, 40 pages.
Jia et al., "3GPP Long Term Evolution: Principle and System Design", Posts & Telecom Press, Beijing, Nov. 2008, 10 pages.
Park et al., "U.S. Appl. No. 61/140,619, filed Dec. 24, 2008", 30 pages.
Park et al., "U.S. Appl. No. 61/148,373, filed Jan. 29, 2009", 36 pages.
Park et al., "U.S. Appl. No. 61/186,663, filed Jun. 12, 2009", 16 pages.
Park et al., "U.S. Appl. No. 61/219,383, filed Jun. 23, 2009", 23 pages.
Park et al., "U.S. Appl. No. 61/220,594", 36 pages.
Sesia et al., "Introduction to Downlink Physical Layer Design", LTE, the UMTS Long Term Evolution: from Theory to Practice, Chichester, U.K., Wiley, 2009, pp. 135-137.
Sesia et al., "Orthogonal Frequency Division Multiple Access (Ofdma)", LTE, the UMTS Long Term Evolution: from Theory to Practice, Chichester, U.K., Wiley, 2009, pp. 115-121.

* cited by examiner

DL BACKHAUL CONTROL CHANNEL DESIGN FOR RELAYS

CROSS-REFERENCE TO RELATED APPLICATIONS

This application is a continuation of U.S. patent application Ser. No. 16/851,461, filed Apr. 17, 2020, which is a continuation of U.S. patent application Ser. No. 15/636,823, filed Jun. 29, 2017, which issued as U.S. Pat. No. 10,660,011 on May 19, 2020, which is a continuation of U.S. patent application Ser. No. 14/621,724, filed Feb. 13, 2015, which issued as U.S Pat. No. 9,756,550 on Sep. 5, 2017, which is a continuation of U.S. patent application Ser. No. 12/855,331, filed Aug. 12, 2010, which issued as U.S. Pat. No. 8,976,806 on Mar. 10, 2015, and claims the benefit of U.S. Provisional Patent Application No. 61/256,159, filed Oct. 29, 2009, and U.S. Provisional Patent Application No. 61/234,124, filed Aug. 14, 2009, the contents of both of which are incorporated by reference herein in their entirety.

BACKGROUND

Relaying is used as a technology to enhance coverage and capacity, (e.g., long term; evolution advances (LTE-A) system information (SI)), and offers more flexible deployment options. Relaying may be used with, other technologies as well. For example, a type I relay may be included as one of the technology components for LTE-A. A type I relay creates new cells, distinguishable and separate from the cells of a donor eNodeB (eNB). To any legacy release 8 (R8) wireless transmit/receive unit (WTRU), a type I relay may appear as an eNB, (i.e., the presence of a type I relay in its communication path to the donor eNB is transparent to the WTRU). A type I relay node (RN) may be described as an eNB that has a wireless in-band backhaul, link back to the donor eNB by using an LTE or LTE-A air interface within the international mobile telecommunications (IMT) spectrum allocation.

SUMMARY

Methods and apparatus are described for providing compatible mapping for backhaul control channels, frequency first mapping of control channel elements (CCEs) and tree based relay resource allocation. Methods and apparatus for mapping of control signals, such as Un downlink (DL) control signals, between a base station (e.g., eNB) and a relay node (e.g., type I relay node) are described. This includes time-frequency mapping of the control signals into RBs of MBSFN-reserved sub-frames in the RN cell and encoding procedures.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
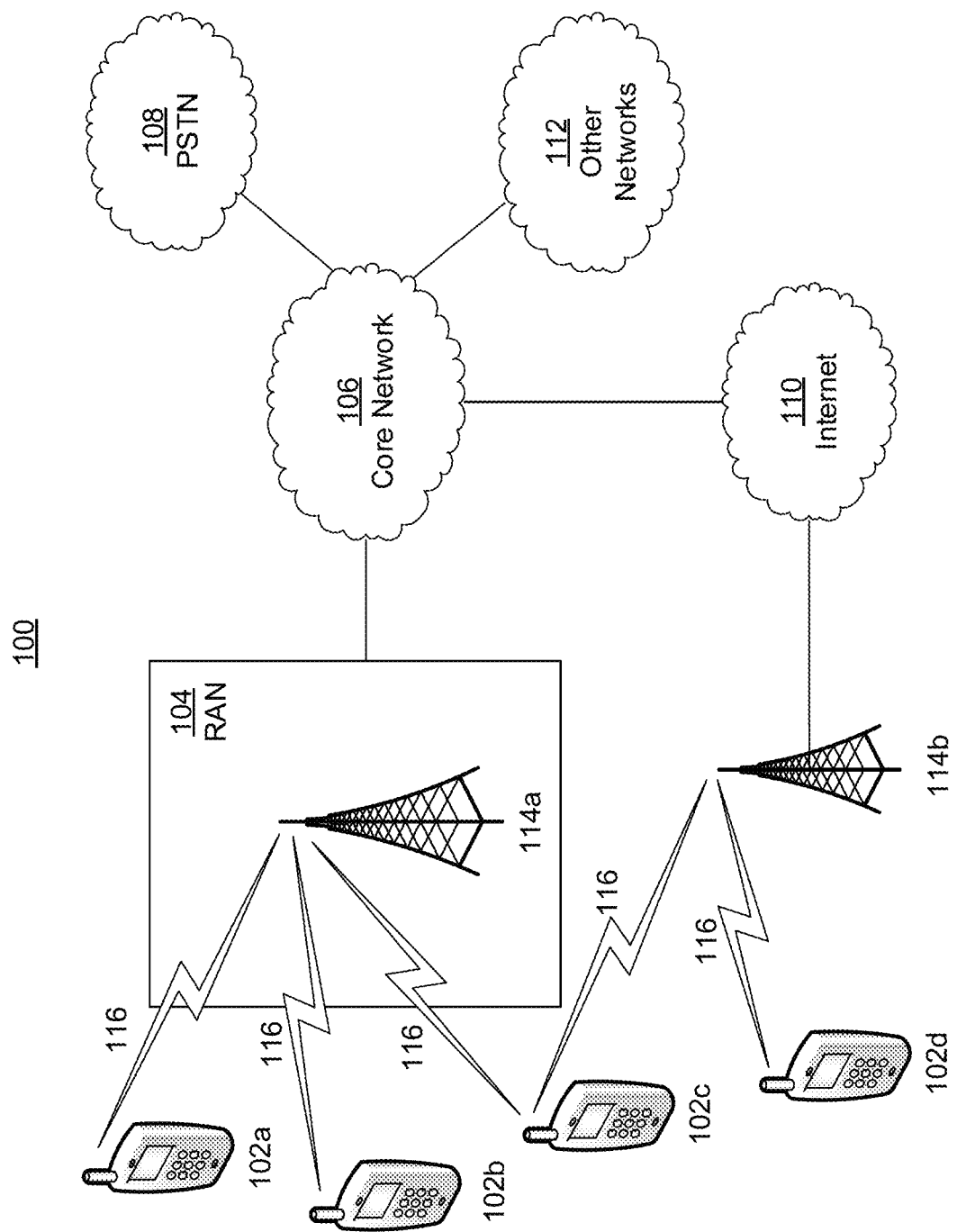
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA); orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 1.04; a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call, control, billing services, mobile location-based services, pre-paid calling, Internet connectivity, video, distribution, etc., and/or perform high-level security functions, such as, user authentication. Although not shown in FIG. 1A, it will be appreciated that the RAN 104 and/or the core network 106 may be indirect or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The internet 110 may include a global System of interconnected computer networks and devices that use common communication protocols, such as the transmission control protocol (TCP), user datagram protocol (UDP) and the interne protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
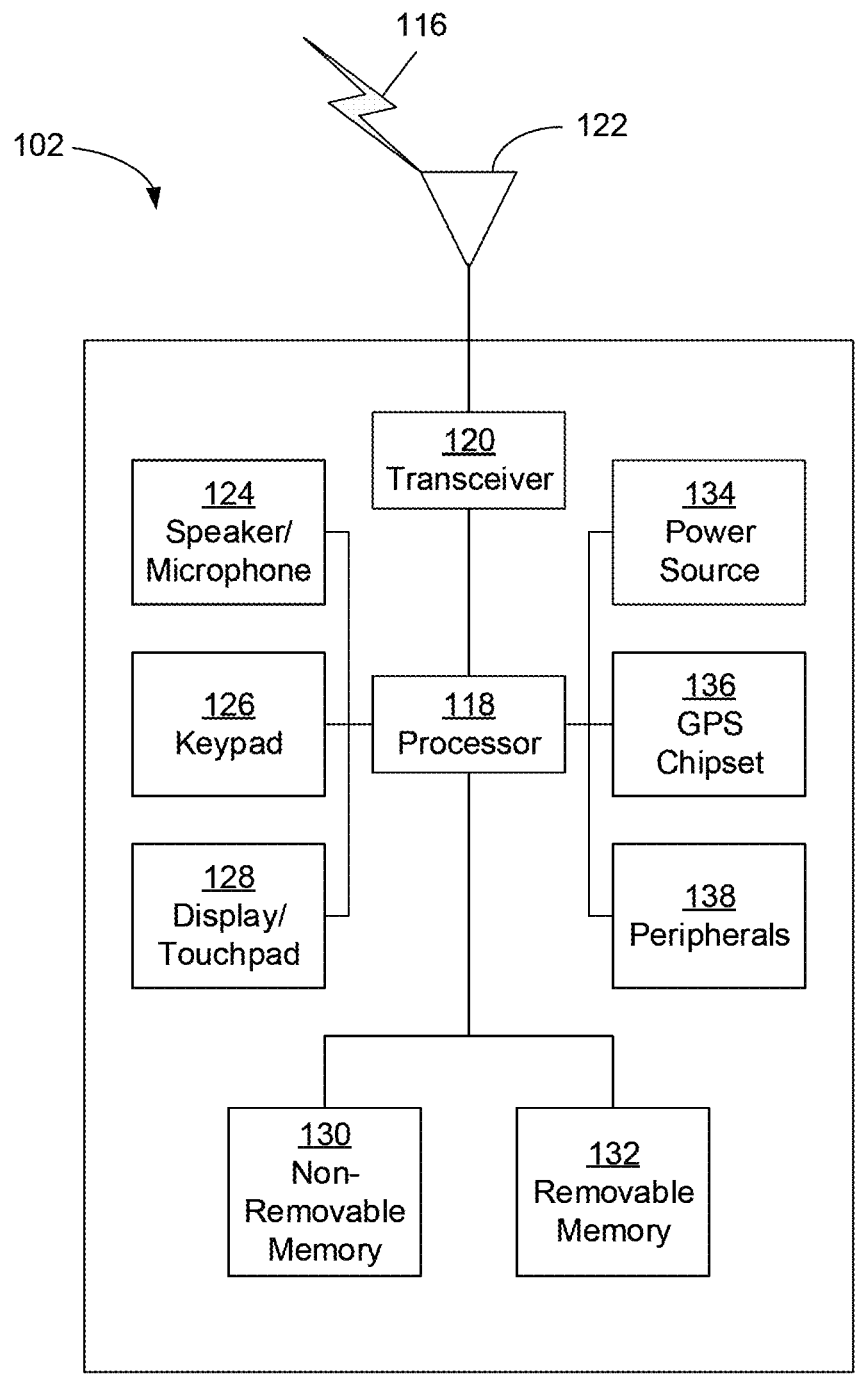
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured-to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video, game player module, an Internet browser, and the like.

Figure 1C:
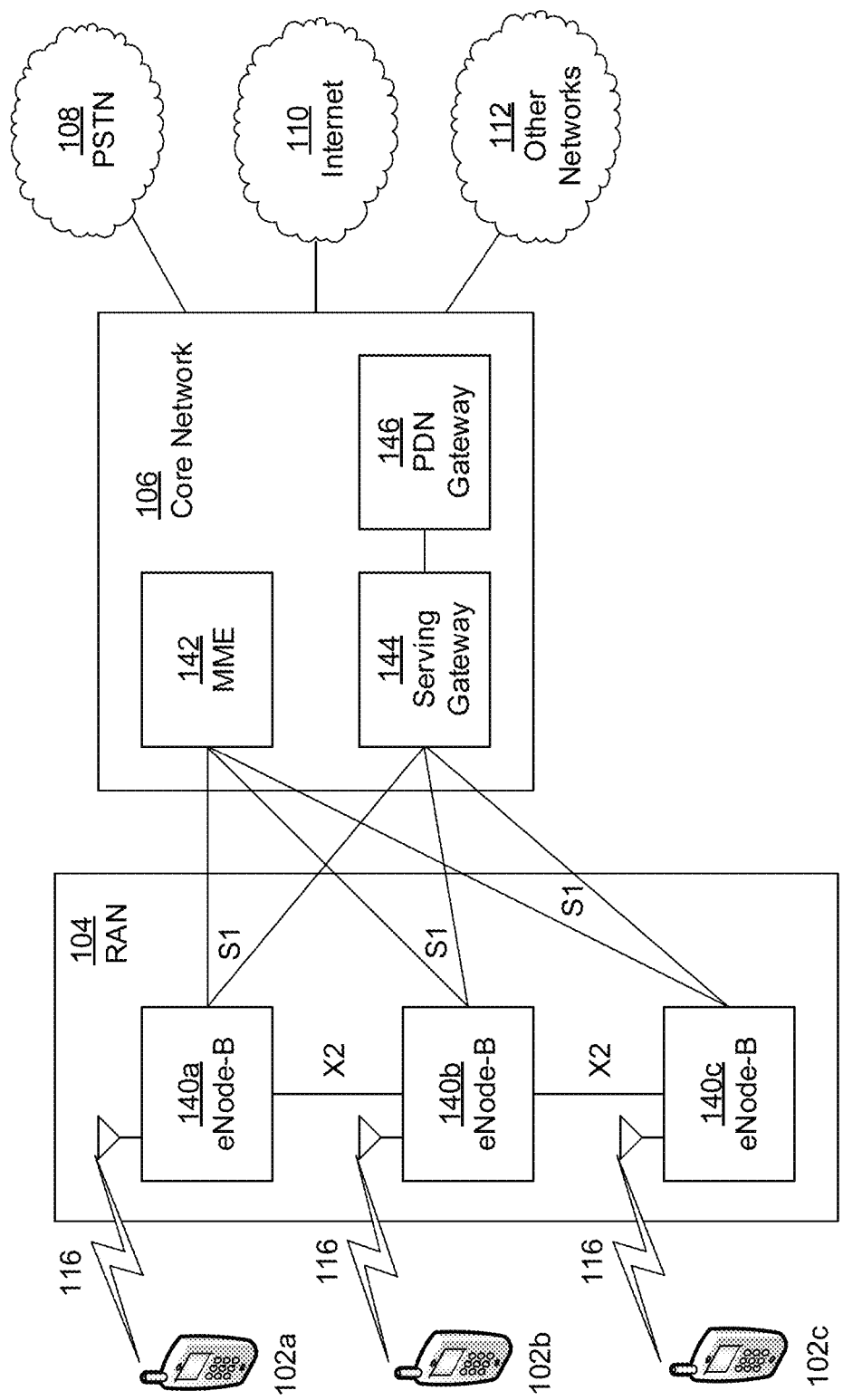
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/of operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c; and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

It is one fundamental design principle of frequency division duplex (FDD)-based in-band relaying that a type I RN cannot simultaneously transmit to a WTRU on the access link while receiving from the donor eNB on backhaul link in the downlink (DL) shared access and backhaul frequency channel, or receive from a WTRU on the access, link while transmitting to the donor eNB on the uplink (UL) shared access and backhaul frequency channel.

During radio access network (RAN) 1#56, it has been agreed that multimedia broadcast multicast services (MBMS) single frequency network (MBSFN) sub-frames may be used as a means to allow backward compatible implementation of relaying and to allow for donor eNB to RN transmissions on the DL frequency channel respecting the legacy R8 frame structure.

MBSFN sub-frame allocation is limited to six (6) sub-frames per frame, (for LTE FDD mode), and no MBSFN sub-frame may be configured in sub-frames #0, #4, #5 and #9 in the case of frame structure type 1.

During RAN 1#57, the principles of DL access link and DL backhaul link sub-frame boundary alignment and semi-static assignment of time-domain resources for the DL backhaul link have been accepted. In addition, the introduction of relay physical downlink shared channel (R-PDSCH), relay-physical uplink shared channel (R-PUSCH) and relay-physical downlink control channel (R-PDCCH) has been agreed.

Figure 2:
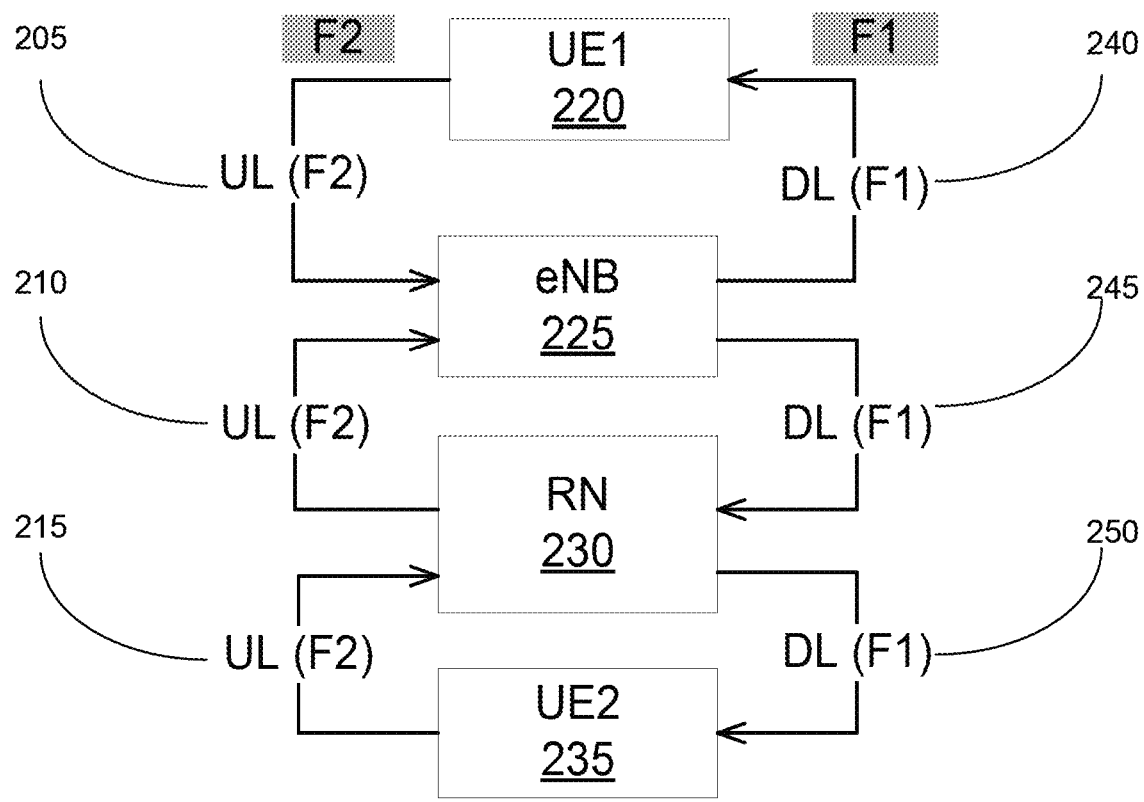
FIG. 2 shows duplexing diagram for a relay for which the methods herein can be implemented.

A RN deployment is shown in FIG. 2. For Type 1 (inband) relays, the RN 230 to eNB 225 link 210 must operate on the UL carrier, and the eNB 225 to RN 230 link 245 must operate using the DL carrier. The eNB 225 to RN 230 link 245 and the RN 230 to UE2 235 link 240 share the same DL carrier frequency, and similarly the RN 230 to eNB 225 link 210 and the UE2 235 to RN 230 link 205 share the same UL carrier.

From the macro eNB 225 perspective, the RN 230 may appear as a regular or as a special WTRU, while simultaneously, the RN 230 may appear as a regular eNB to UE2 that is being served by the RN 230, (i.e., the UE2 camps on and gets service from the RN 230 in a way that is the same as from a regular eNB). For illustration purposes in FIG. 2, it is assumed that UE1 is a WTRU that is served by the macro eNB 225, and UE2 is a WTRU that is served by the RN 230.

Since the RN 230 cannot simultaneously transmit (Tx) and receive (Rx) in the same DL frequency band (F1), the eNB 225 to RN 230 and RN 230 to UE2 235 links (i.e., links 245 and 250) are time multiplexed as they share the same carrier. Similarly, the RN 230 to eNB 225 and UE2 235 to RN 230 links (i.e., links 210 and 215) are also time multiplexed in the UL frequency band F2.

In other words, the RN 230 operates as a FDD-eNB from UE2 235 perspective, but the RN 230 itself has to support TDD operation (Tx and Rx switching) in both DL and UL carriers. Note that there is no impact on the eNB 225 as it operates in the usual fashion (DL Tx on F1, and UL Rx on F2).

The time-multiplexing of the eNB 225 to RN 230 and RN 230 to UE2 235 links (i.e., links 245 and 250) can be efficiently supported via the flexible MBSFN Signaling provided by LTE R8 specifications. The RN configures some (up to a maximum of 6) sub-frames in the RN cell as MBSFN-reserved sub-frames. Therefore, relay WTRUs will only expect and attempt to decode the control region in these, but not expect any DL assignments or PDSCH transmission. Note that the MBSFN-reserved sub-frames in the Relay cell might not necessarily appear to the WTRU served by the donor eNB cell as MBSFN sub-frames. Moreover, these reserved sub-frames in the Relay cell might not appear to the Relay on the backhaul link as an MBSFN sub-frames in the sense of providing MBMS services. In a MBSFN reserved sub-frame, the RN first transmits in the DL access link in the control region, followed by some Tx to Rx switching time (for example, 1 symbol), and receiving itself transmissions from the eNB on the DL backhaul link.

In the DL, the donor eNB can in principle transmit DL assignments (and PDSCH), DL positive acknowledgements (ACKs)/negative acknowledgements (NACKs) on physical hybrid automatic repeat request (HARQ) indicator channel (PHICH) and UL grants (for PDSCH) to its served macro WTRUs in any DL sub-frame however in order to avoid self-interference between the Relay transmitter and receiver, the donor eNB should make DL transmission in sub-frames broadcasted by the RN in its cell as MBSFN sub-frames. Similarly, the RN may transmit DL ACKs/NACKs and UL grants to its served relay WTRUs in any DL sub-frame. However, in order to avoid self-interference between the Relay transmitter and receiver, the RN may transmit PDSCH to its relay WTRUs only in sub-frames not configured as MBSFN sub-frames.

The following operating principles for RN and donor eNB operation have been agreed. At the RN, the access link DL sub-frame boundary is aligned With the backhaul link DL sub-frame boundary (except for possible adjustment to allow for RN Tx/Rx switching). The set of DL backhaul sub-frames, during which DL backhaul transmission may occur, is time-domain resources (set of sub-frames) that may be used for the DL backhaul link, and are semi-statically assigned. It has not been determined whether the time-domain resources for the UL backhaul link are to be also semistatically assigned. The set of UL backhaul subframes, during which UL backhaul transmission may occur, can be semi-statically assigned, or implicitly derived from the DL backhaul subframes using the HARQ timing relationship.

A new physical control channel which may be called the relay physical downlink control channel (R-PDCCH), may be used to dynamically or "semi-persistently" assign resources, within the semi-statically assigned sub-frames, for the DL backhaul data, the relay physical downlink shared channel (R-PDSCH). The R-PDCCH is also used to dynamically or "semi-persistently" assign resources for the UL backhaul data, the relay physical uplink shared channel (R-PUSCH).

The R-PDCCH may be transmitted on a subset of the physical resource blocks (PRBs) of the subframes assigned for the DL backhaul link. A predefined number of resource blocks (RBs) may be reserved for a backhaul control channel. The reserved RBs may be fixed by the specifications, semi-statically signaled to relay node, or signaled via any other-channel, e.g., relay-physical control format indicator channel (R-PCFICH). When R-PCFICH or a similar channel is used to signal the reserved RBs, in order to minimize the overhead, the selection can be made from a set of predefined patterns. The R-PCFICH itself may be located in a standard specified RB, (e.g., center of bandwidth). The R-PDCCH may be transmitted on a subset of the orthogonal frequency division multiplexing (OFDM) symbols of the subframes assigned for the DL backhaul link. This subset of OFDM symbols may include the full set of OFDM symbols available for the backhaul link. The R-PDCCH may be transmitted starting from an OFDM symbol within the subframe that is late enough so that the RN can receive it. The R-PDCCH may be used to assign DL resources in the same subframe and/or in one or more later subframes. The R-PDCCH may be used to assign UL resources in one or more later subframes. The R-PDSCH and the R-PDCCH may be transmitted within the same PRBs or within separated PRBs. The backhaul control channel RBs may carry R-PDCCH, relay-physical automatic repeat request (HARQ) indicator channel (R-PHICH) and if needed, R-PCFICH.

Frequency division multiplexing (FDM), time division multiplexing (TDM) and a hybrid multiplexing scheme (TDM+FDM, or equivalently FDM+TDM) are possible candidates for resource multiplexing between relay resources, (R-PDCCH and R-PDSCH), or between relay resources, (R-PDCCH, R-PDSCH), and non-relays resources, (PDCCH, PDSCH).

Backhaul control channels design may require details of control channel mapping in frequency and time domains at the eNodeB, and decoding at the relay (or any other receiver of R-PDCCH such as a WTRU), of the control channels without the use of R-PCFICH. The methods, systems and apparatuses herein support ACK/NACK, reduction of R-PDSCH decoding delay, reduction of blind search processing time related power consumption, minimization of the amount of overhead signaling for control channels, and minimization of the bandwidth requirement for control channels.

Relay operation is described herein for the case of in-band, (i.e., RN-eNB link share the same carrier with RN to WTRU access link), in FDD networks. However, methods and procedures described are equally applicable to TDD networks. Furthermore, relay design on the Un interface between a RN and an eNB is described. Specifically, several methods and procedures are described of how one or more control signal(s), eNB to RN DL ACK/NACK and R-PDCCH to carry Un DL assignments or Un UL grants, are encoded and transmitted from the eNB to the RN. While the ideas presented herein are primarily described using relay type I terminology, they are applicable to other types of relays as well, notably non-transparent or non-self-backhauling type of relays amongst others.

A method is described for control channel mapping with multiplexing and interleaving of R-PDCCHS from multiple relays. If interleaving is applied, it may be performed on an OFDM symbol basis. R-PCFICH may not be used.

Methods are described of mapping of the R-PDCCH the time-frequency grid, where the R-PDCCH is first mapped along the frequency domain across the OFDM symbols of the control channel (which also may be referred to as OFDM control symbols) followed by the time domain. One advantage of the frequency first mapping is to eliminate the use of R-PCFICH or similar channels.

A tree based assignment of RBs may be used to minimize the resource allocation overhead. A method is described to configuring the relay specific configuration parameters. Dedicated R-PDCCH (and downlink control information (DCI) format) in support of ACK/NACK are described, whereby R-PHICH/PHICH channel performance requirements are typically more stringent than a typical R-PDCCH/PDCCH. Signaling of ACK/NACK over R-PDCCH may be employed when R-PHICH is not used.

Figure 3:
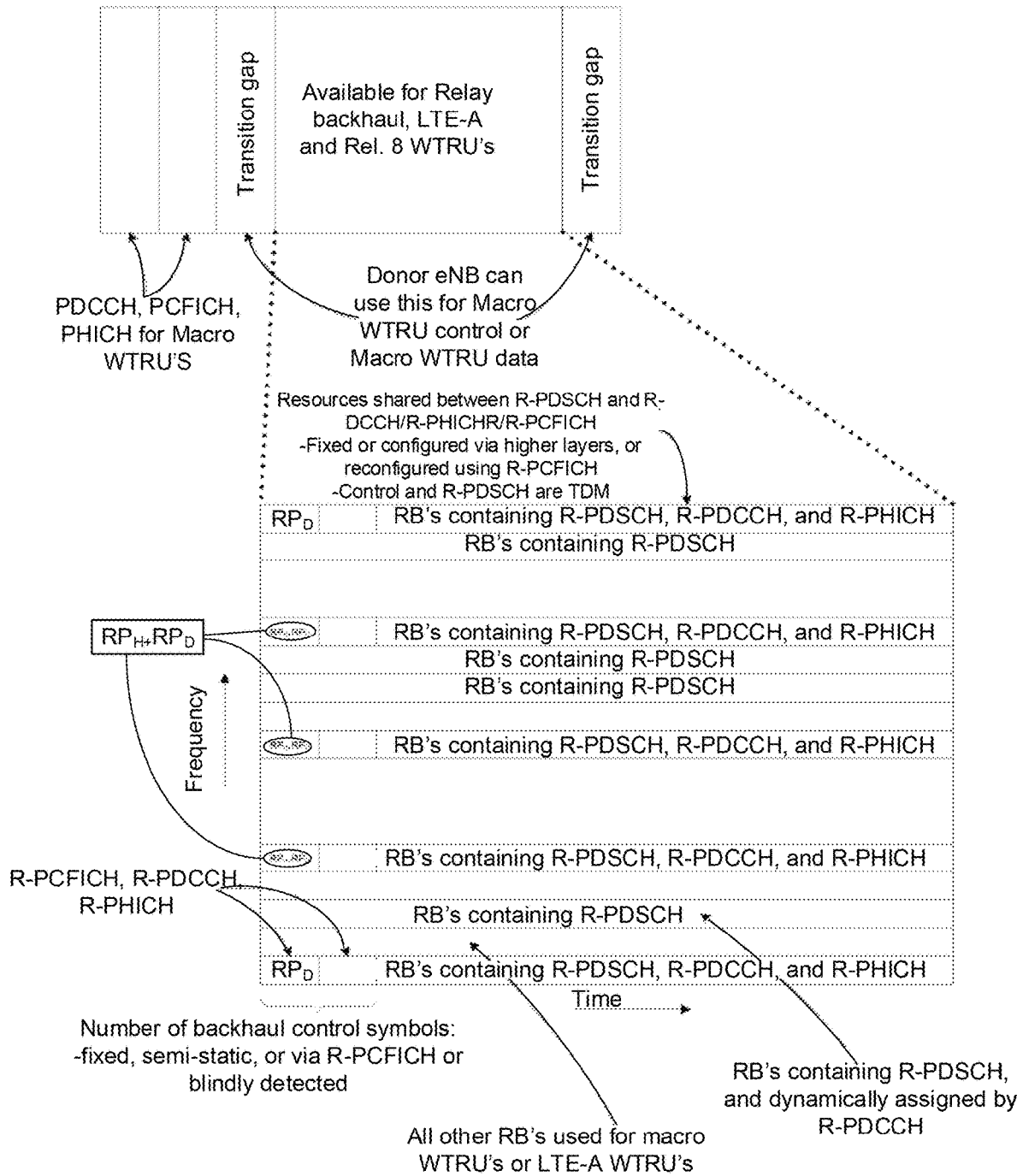
FIG. 3 shows an example of backhaul control channel mapping.

FIG. 3 shows an example of backhaul control channel mapping. Assignments in the frequency domain may be in units of RBs or resource block groups (RBGs) or any other unit thereof. Herein the units may be considered to be RBs with the understanding that the design scales according to the units.

In order to maximize the frequency diversity, the relay control channels may be mapped uniformly across the entire spectrum. RBs for backhaul control channel may be selected according to the following equation:

$$R_l(i) = \lfloor i \cdot N_{l,RB}^{DL}/N_{l,MAX\_REL\_RB} \rfloor + k, \quad \text{Equation (1)}$$

where, $R_l(i)$=RB index for lth OFDM Control symbol;
i=0, 1, 2 ... $N_{l,MAX\_REL\_RB}$−1;
$N_{l,MAX\_REL\_RB}$=the number of RB's reserved for backhaul control channel of the lth OFDM control symbol;
$N_{l,RB}^{DL}$=Maximum number of RB's in the lth OFDM control symbol; and
k=an integer derived from donor eNb cell ID in a manner similar to release 8.

The additions are modulo $N_{l,RB}^{DL}$.
As an example, if $N_{l,RB}^{DL}$=20 and $N_{l,MAX\_REL\_RB}$=5, then $$R_l(i)=([0\ 4\ 8\ 12\ 16]+k) \bmod 20\ R_l(i)=([0, 4, 8, 12, 16]+k) \bmod 20,$$

If k mod 20=0, 1, 2, 3, then $R_l(i)$ is in the range of 0 to 19 for all i=0 ... $N_{l,MAX\_REL\_RB}$−1 and no wrap around occurs for OFDM symbol "l". If k mod 20≥4, then wrap-around occurs. For example, if k mod 20=15, then $$R_l(i)=([0\ 4\ 8\ 12\ 16]+15) \bmod 20 = [15\ 19\ 3\ 7\ 11]$$

$$R_l(i)=([0, 4, 8, 12, 16]+15) \bmod 20 = [15, 19, 3, 7, 11],$$

The RBs with indices 15 and 19 correspond to OFDM symbol "l", while the RB with indices 3, 7 and 11 (which are the RB where the wrap-around occurs), may be mapped according to this invention to either OFDM symbol "l", or OFDM symbol "l+1".

One of the following methods may be used to accommodate the modulo operation: 1) use the next OFDM symbol allocated for the backhaul control and continue the mapping; 2) wrap around in the same OFDM symbol and populate all available RBs. Once all RBs are utilized, continue mapping over the next OFDM symbol from either a) the next RB location given by Equation (1) above, or b) a RB location given by setting i=0 in Equation (1). $N_{l,MAX\_REL\_RB}$ may be standardized for each bandwidth option, or derived from the bandwidth as a fraction of the total number of RBs, (e.g., $N_{l,MAX\_REL\_RB}=\alpha \cdot N_{l,RB}^{DL}$, where α is a fraction that can take values like α={1, ½, ⅓, ¼ ...}). Alternatively, spacing between the adjacent RBs dedicated to backhaul control channels can be specified, and $$N_{l,MAX\_REL\_RB} = N_{l,RB}^{DL}/\delta_{RB},\quad\text{Equation (2)}$$

where $\delta_{RB}$ the spacing units of RB and $\delta_{RB}$ can be from a predefined set of integers specified in the standards or a function of system bandwidth.

To provide flexibility and optimize resource allocations, the donor eNB might not utilize $N_{l,MAX\_REL\_RB}$ RBs. It is not necessary to signal the actual number of RBs used. The relay node may perform blind decoding over a varying number of RBs until it finds the required number of grants or reaches $N_{l,MAX\_REL\_RB}$. To reduce the blind decoding complexity, the donor eNB may be restricted to use only a pre-determined number of RBs, (e.g., from the set {1, 2, 4, 8, $N_{l,MAX\_REL\_RB}$}).

To permit maximum flexibility in scheduling R8 WTRUs, backhaul control channel RB allocations may be made conformant to resource allocation types 0, 1 or 2. When a type 2 allocation is used with distributed virtual resource blocks, control channel can be split between the two time slots in a manner similar to PDSCH.

Resources can be dedicated to relays in various ways as described above. To introduce greater flexibility and scalability, mapping modes can be defined and signaled via higher layers. Higher layer signaling could be achieved through system information broadcast (with additional Information Element such as control channel RB configuration mode or RB allocation bit map in SIB2 for example), RRC (Radio Resource Control) signaling or NAS signaling. As an example, with 3 bits, 8 modes can be defined as shown in Table 1 below.

TABLE 1

| Mode | Mapping |
| --- | --- |
| 000 | $N_{l,MAX\_REL\_RB}$ in center of band |
| 001 | $N_{l,MAX\_REL\_RB}$ uniformly distributed across entire bandwidth |
| 010 | Resource allocation type 0 with pre configured allocation |
| 011 | Resource allocation type 1 with pre configured allocation |
| 100 | Resource allocation type 2 with pre configured allocation |
| 101 | Other configurations |
| 110 | Other configurations |
| 111 | Other configurations |

Preconfigured allocation may imply that the parameters that determine the exact RBs in each allocation type are standardized. For allocation 0 and 1, the value of RBG size, P, and the allocation bit map may be known. For type 2 allocation, the starting resource block, $RB_{start}$, $L_{CRBs}$, and the step size, $N_{RB}^{step}$ are standard specified. Alternatively all the parameters may be signaled along with the operational mode.

The RN might be required to support all backhaul control channel mapping options or alternatively a subset of the available backhaul control channel mapping options. Alternatively, a default backhaul control channel mapping option is specified. The network can signal the backhaul control channel mapping options supported by the network in a system information broadcast message (SIB2 for example) or in RRC signaling or a combination of both. For instance, when the RN is not connected to the network, the RN can acquire the backhaul control channel mapping information through system information broadcast messages. On the other hand, when the RN is in connected mode already, update to backhaul control channel mapping method can be acquired via RRC signaling.

In order to provide full flexibility in scheduling release 8 WTRUs, the RPDSCH may be mapped using one of the resource allocation types used for PDSCH. The R-PDCCH, which may be mapped to RBs, contains the resource allocation for R-PDSCH.

If the RBs assigned to R-PDSCH also carry the backhaul control channel, then the RB may be time multiplexed with backhaul control channels.

If the R-PDCCH spans multiple timeslots, (e.g., when resource allocation type 2 is used for control channel mapping), then R-PDSCH may be punctured to accommodate R-PDCCH.

To maximize the frequency interleaving, R-PCFICH (when used) and R-PHICH may be mapped uniformly across all available backhaul control channel RBs. To maximize the spread, R-PCFICH (when used) and R-PHICH may be mapped in only part (e.g., one third) of the RB.

Figure 4:
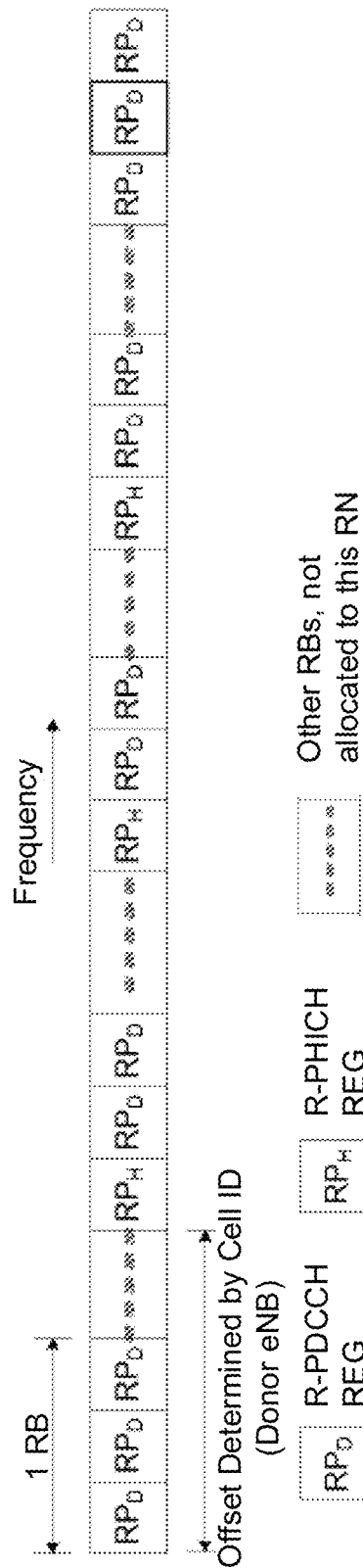
FIG. 4 illustrates a non-limiting, exemplary mapping of an R-PHICH and R-PDCCH over an OFDM symbol when R-PCFICH is not used.
Figure 5:
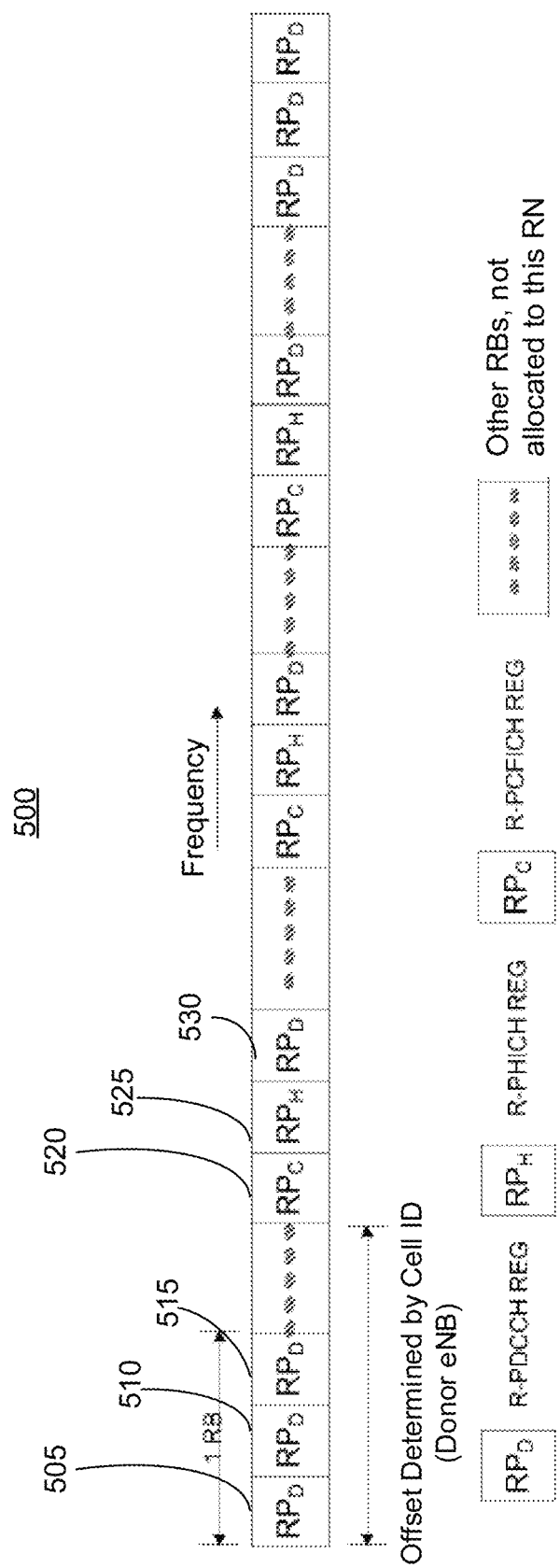
FIG. 5 illustrates a non-limiting, exemplary mapping of an R-PHICH and R-PDCCH over an OFDM symbol when R-PCFICH is used.

FIG. 4 shows an example of mapping the R-PHICH and R-PDCCH over an OFDM symbol when R-PCFICH is not used. FIG. 5 shows an example of mapping the R-PHICH and R-PDCCH over an OFDM symbol when R-PCFICH is used.

The R-PCFICH (when used) may be mapped beginning from a RB whose index is obtained from the donor eNB cell identity (ID). The R-PHICH may be mapped according to an R8 procedure. In an embodiment, if R-PCFICH 525 is mapped to a part of an RB, the other part of the RB may be used by R-PHICH 525 and/or R-PDCCH 520. The remaining RBs may be occupied by R-PDCCH.

The encoded PDCCH for R8 WTRUs are divided into control channel elements (CCEs) and interleaved before being mapped to the time-frequency grid. Mapping is in time-first order. Hence, the number of OFDM control symbols must be known before the decoding process can begin.

Time first mapping does not provide any significant advantage in a relay environment due to limited or no mobility. The R-PDCCH may be mapped in frequency first order, so that decoding can begin as soon as every OFDM symbol is processed and made available to control channel processing unit. This avoids the need to signal the number of OFDM control symbols. Example methods display below.

Figure 6A:
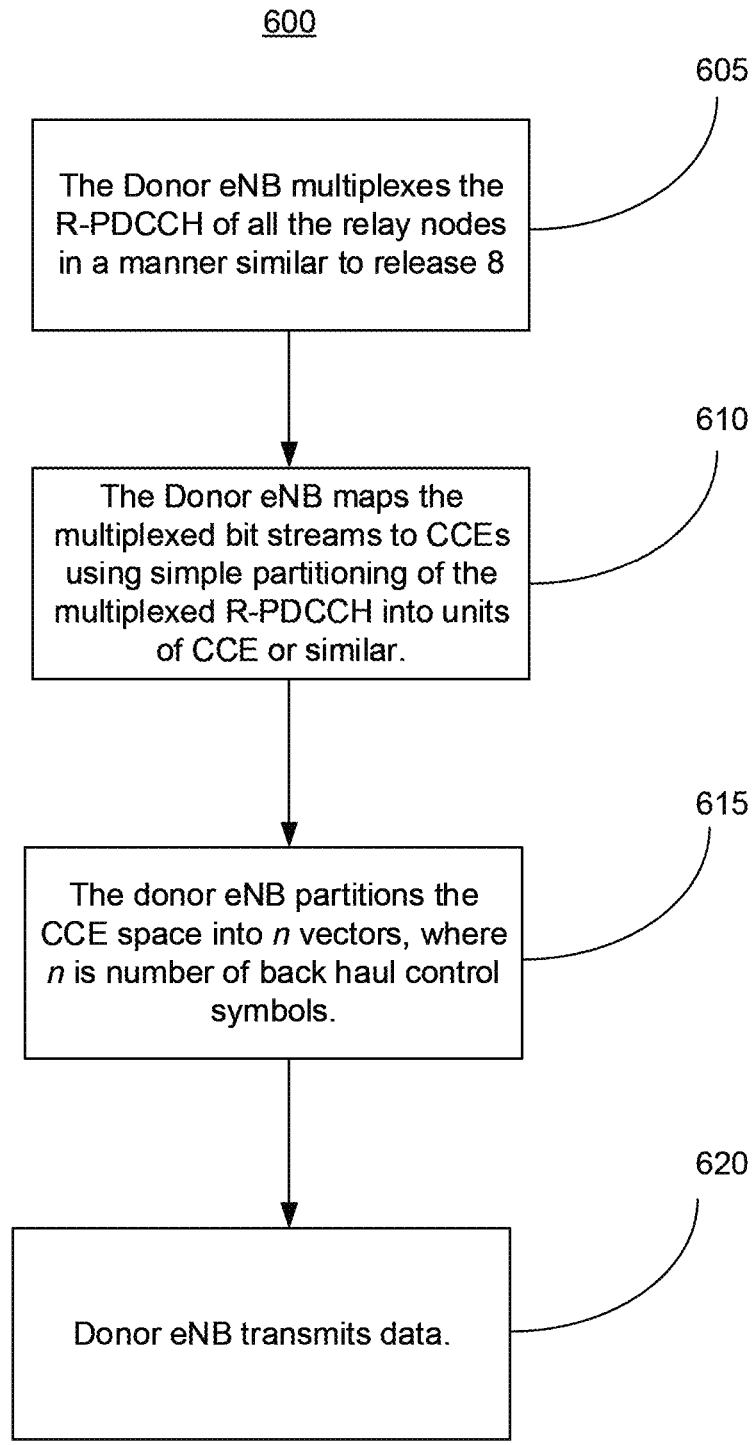
FIG. 6A illustrates a non-limiting, exemplary method of implementing mapping of an R-PDCCH by a eNB.
Figure 6B:
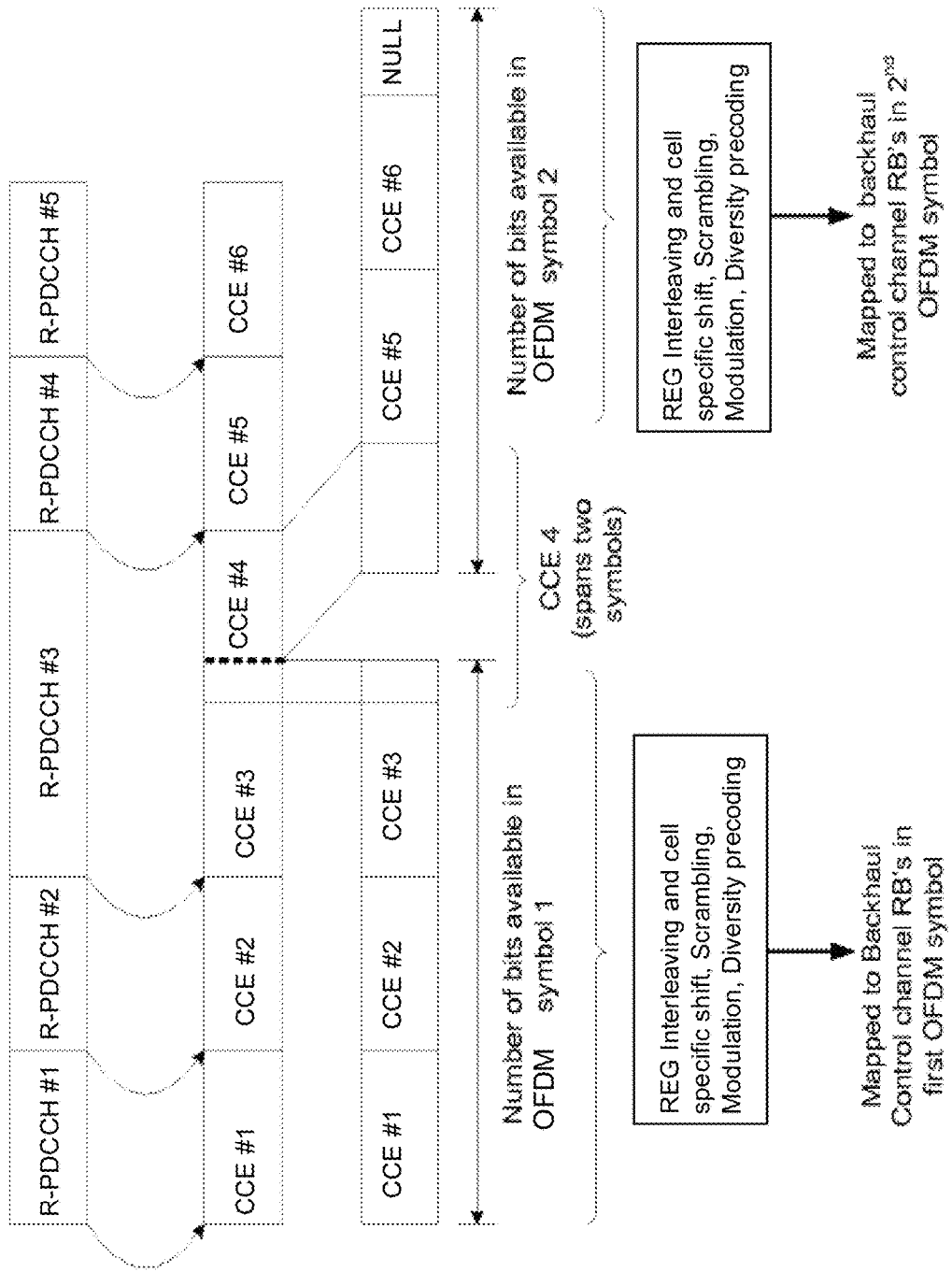
FIG. 6B illustrates a non-limiting, exemplary mapping of R-PDCCH into OFDM symbols.

In one embodiment, as shown in FIG. 6A, at block 605 the donor eNB multiplexes the R-PDCCH of all of the relay nodes in a manner similar to R8. At block 610, the donor eNB may map the multiplexed bit streams to CCEs by simple partitioning Of the multiplexed R-PDCCH into units of CCEs or similar. At block 615, the donor eNB may partition the CCE space into n vectors, where n is the number of backhaul OFDM control symbols. At block 620, the donor eNB transmits data. The method in FIG. 6A, allows a CCE to be mapped across two consecutive OFDM symbols. Also, once the R-PDCCHs for multiple RNs are multiplexed together, the order in which the CCEs are mapped to (RBs) is the same as the order of R-PDCCHs in the multiplexed vector. FIG. 6B shows an example of the embodiment where the mapping is performed over two OFDM symbols and a CCE may be mapped across two OFDM symbols. In other words, for example, the first OFDM symbol may comprise one or more whole control channel elements (e.g., CCE #1, #2, and #3) and one partial control channel element (e.g., #4 which spans over OFDM symbol #1 and #2).

Figure 6C:
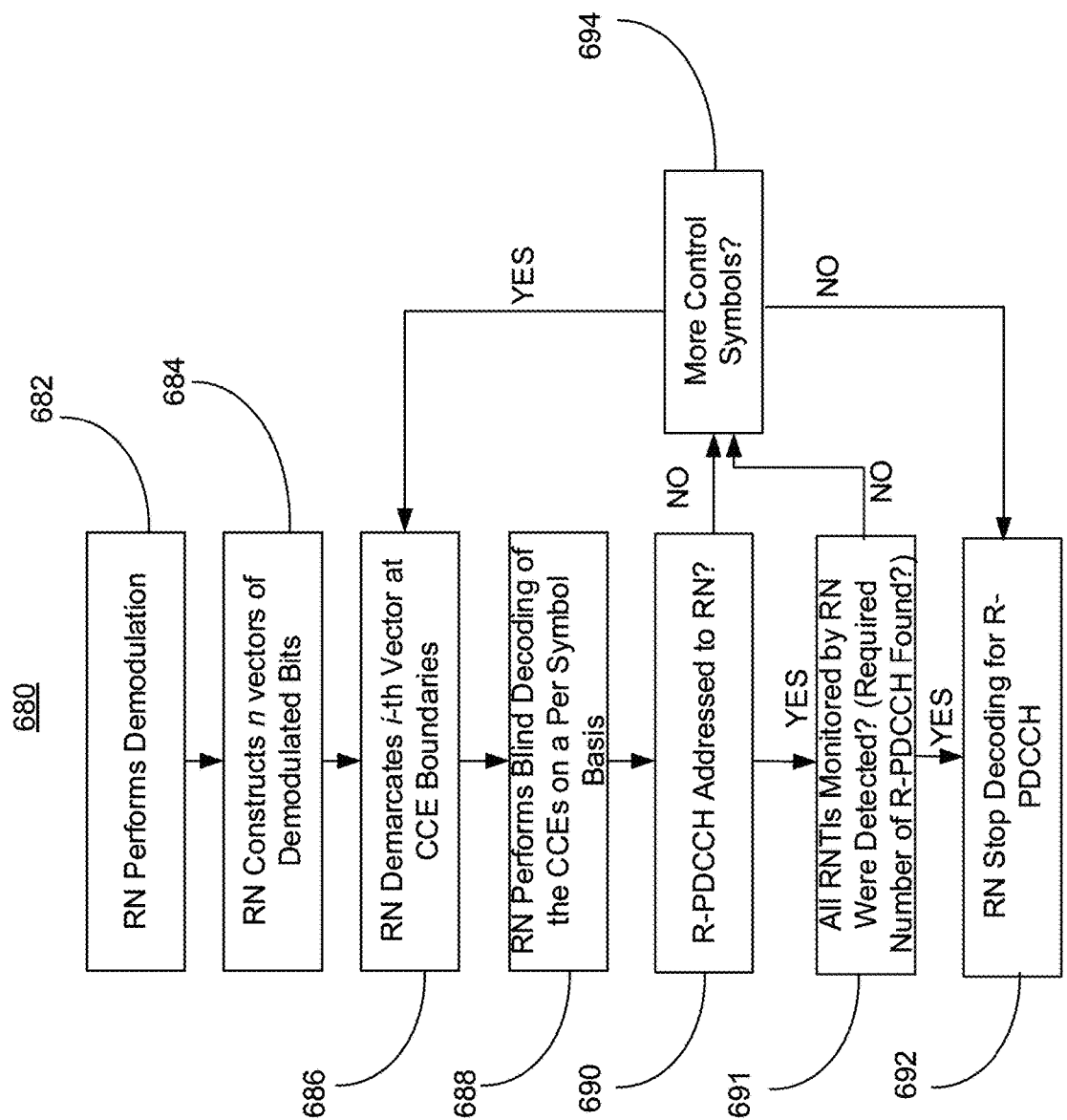
FIG. 6C illustrates a non-limiting, exemplary method of implementing decoding of R-PDCCH by a relay.

The size of the $i^{th}$ vector, where i=1 . . . n (and "n" is the number of backhaul OFDM control symbols). Note "i" hereinafter is not equivalent to "i" given in Equation (1). R8 techniques are reused for modulation, interleaving and pie-coding. The $i^{th}$ vector is mapped over the $i^{th}$ OFDM symbol reserved for the backhaul OFDM control symbol along increasing (or decreasing) order of RBs. The CCEs may be mapped to frequency and time domains. Note that the mapping may be performed in the frequency first order unlike R8, where the mapping is performed in time first order. FIG. 6C displays what may occur at the receiver, for each OFDM control symbol. In general a processor may receive from an eNodeB, for example, consecutive first and second OFDM symbols that represent a plurality of relay physical downlink control channels (R-PDCCH) that comprises a first R-PDCCH and a second R-PDCCH. Then the processor may decode the first R-PDCCH from the first OFDM symbol which is received before the second OFDM symbol. In FIG. 6C at block 682, the RN performs demodulation and at block 684 constructs n vectors of demodulated bits where the length of $i^{th}$ (i=1 . . . n) vector is equal to the number of bits in the ith OFDM control symbol. At block 686, the RN demarcates the ith vector at CCE boundaries where bits beyond the integer number of CCEs are considered as a part of the following OFDM control symbol. At block 688, the RN may perform blind decoding over the CCEs on a per OFDM control symbol basis. This is, possible since interleaving may be performed over the span of a single OFDM symbol.

If no R-PDCCH addressed to the relay node is found (i.e., No at block 690), the RN continues to decode following vector of demodulated bits. There is a "CCE wrap around" that the RN has to account for. If there are more OFDM control symbols (i.e., Yes at block 694) the bits not used for blind decoding in the previous OFDM control symbol are appended to the vector of bits from the current OFDM symbol. The RN may start again at block 686 and process the reconstructed vector of demodulated bits.

If a R-PDCCH addressed to the relay node is found (i.e., Yes at block 690), then the RN checks at block 691 if all monitored R-PDCCH (i.e. all monitored RNTIs) have been detected. The RN may continue decoding until the required number of R-PDCCH are found (i.e., Yes at block 691) or the maximum number of OFDM control symbols are reached (i.e., No at block 694). The maximum number of OFDM control symbols can be standardized, or tied to other system parameters like bandwidth, or signaled by higher layers.

Figure 7A:
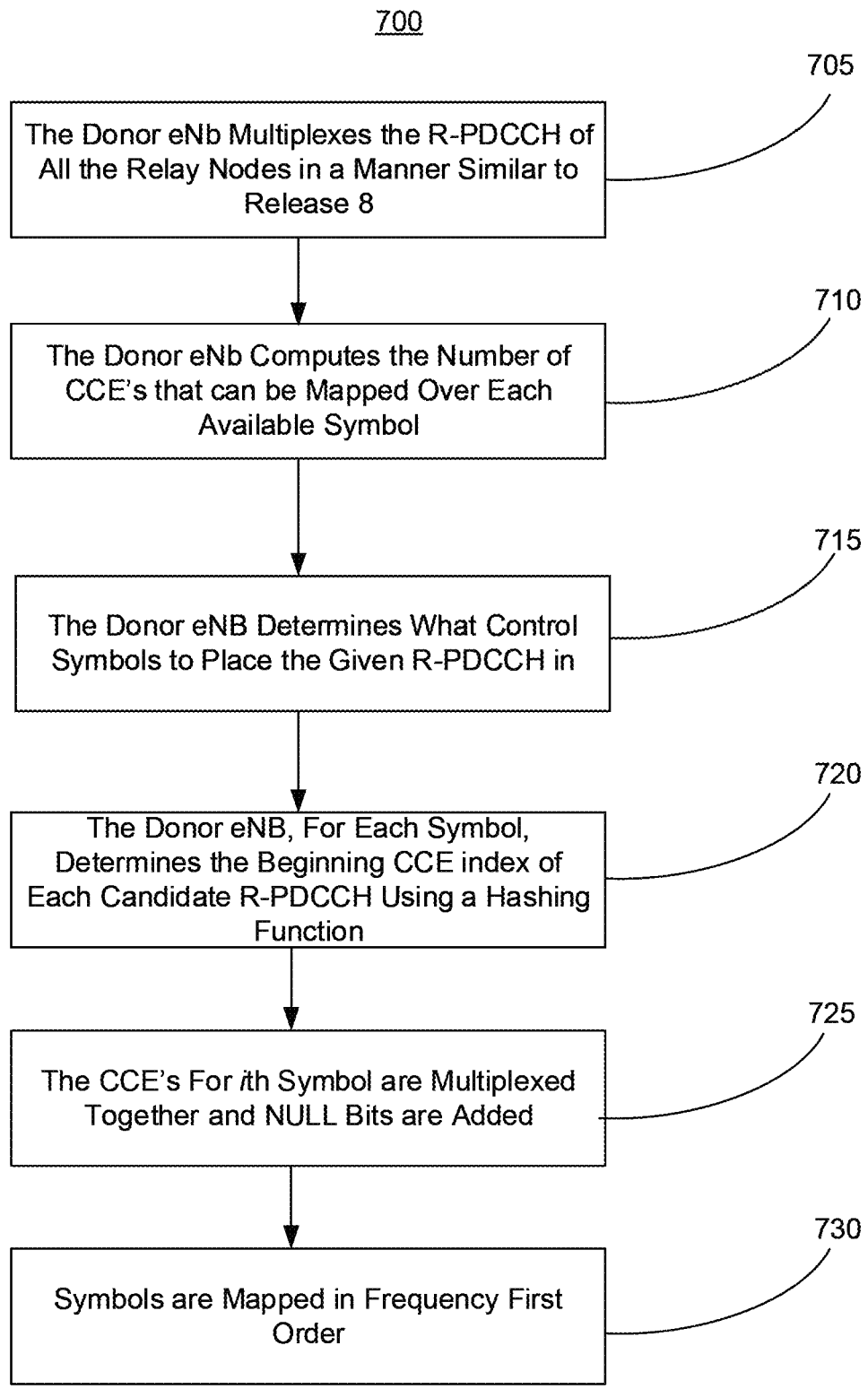
FIG. 7A illustrates a non-limiting, exemplary method of implementing mapping of an R-PDCCH by a eNB.
Figure 7B:
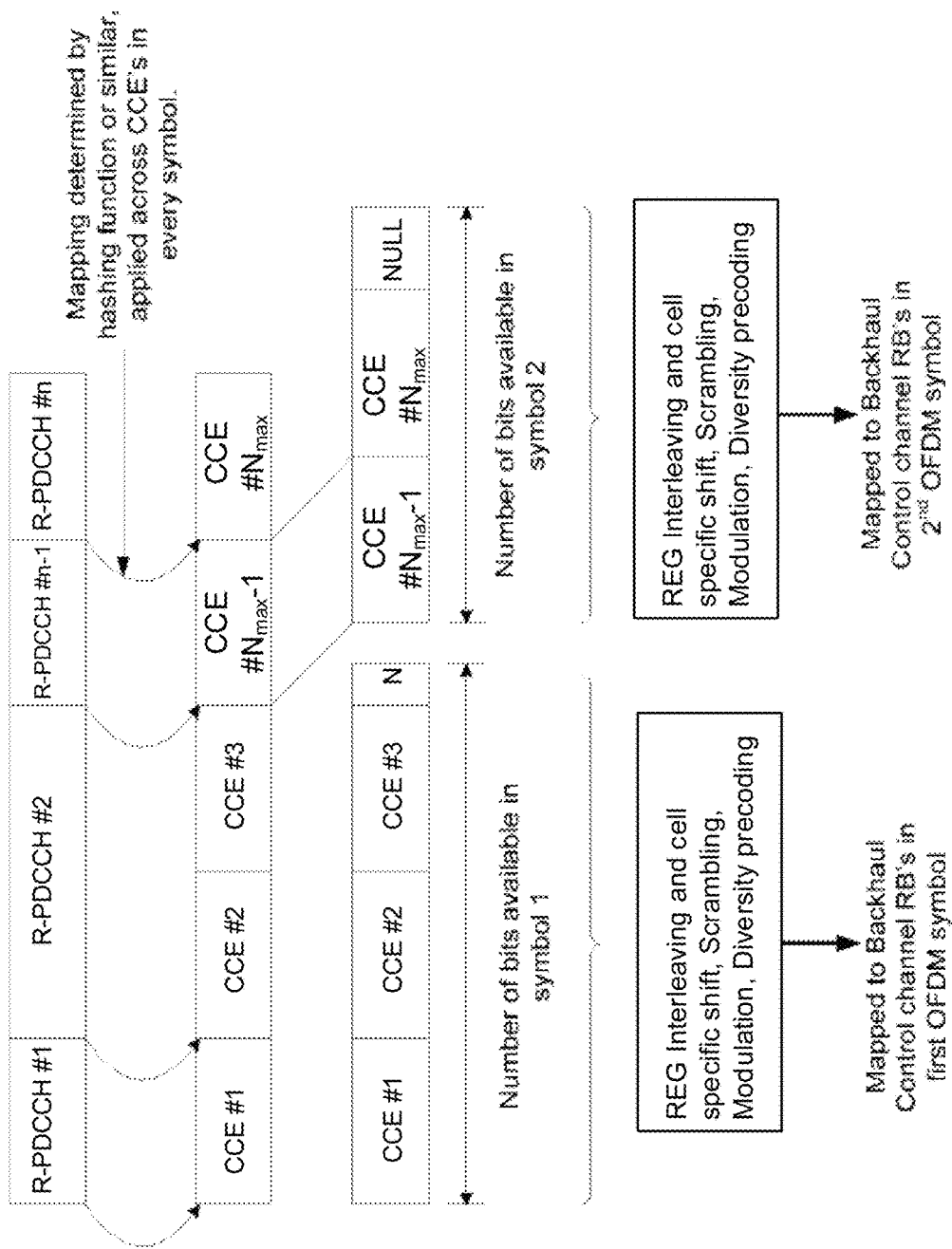
FIG. 7B illustrates a non-limiting, exemplary mapping of R-PDCCH into OFDM symbols.
Figure 7C:
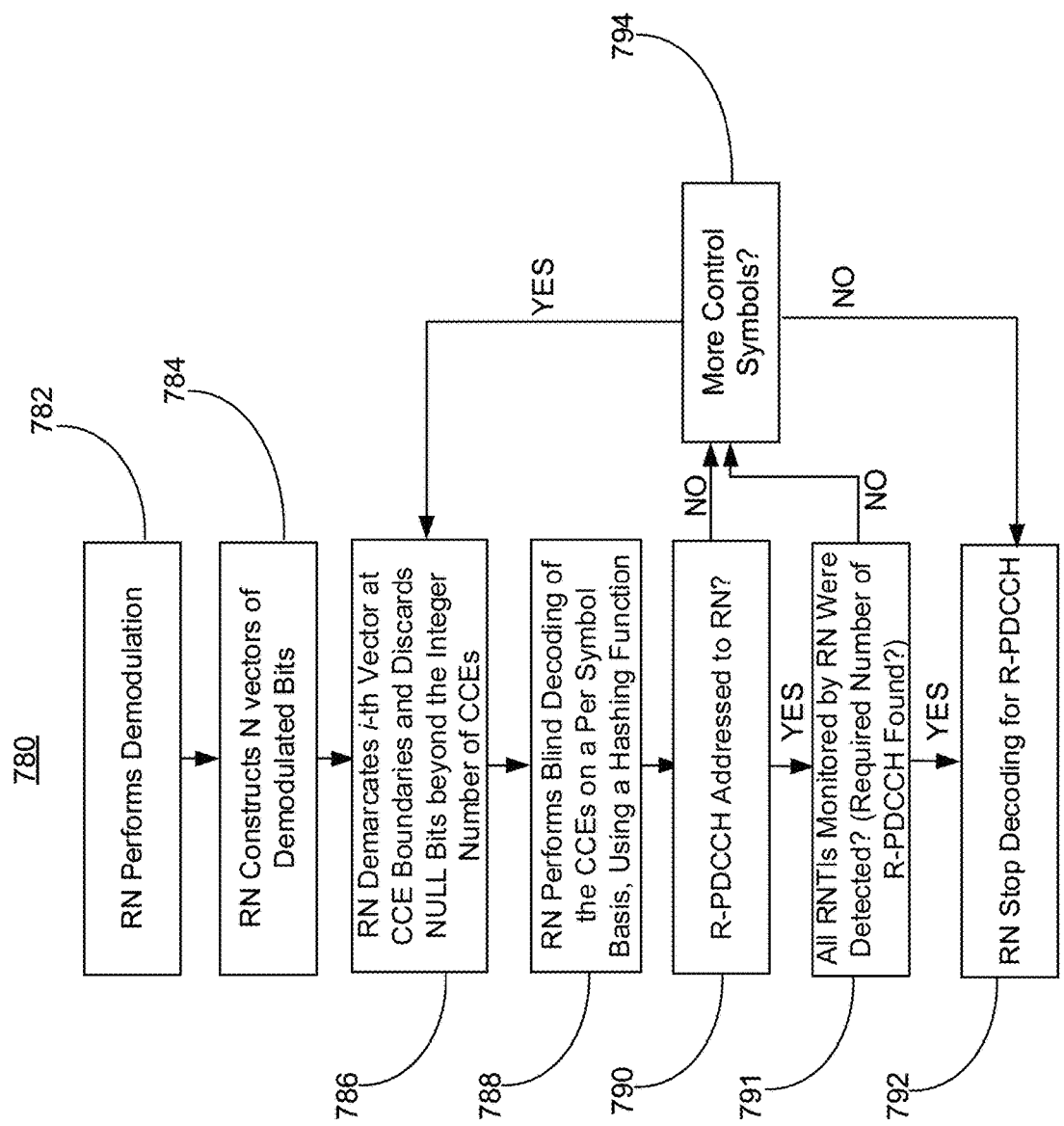
FIG. 7C illustrates a non-limiting, exemplary method of implementing decoding of R-PDCCH by a relay.

In an embodiment, as shown in FIGS. 7A thru 7C, randomization of the mapping the R-PDCCH over the CCE space may be allowed.

At block 705, the donor eNB may multiplex the R-PDCCH of all the relay nodes in a manner similar to R8. At block 710, the donor eNB may compute the number of CCEs that can be mapped over each available OFDM symbol, such that every CCE is mapped within a single OFDM symbol (that is, no CCE spans two OFDM symbols). At block 715, the donor eNB may determine what OFDM control symbols to place the given R-PDCCH in. At block 720, the donor eNB, for each symbol, may determine the beginning CCE index of every candidate R-PDCCH using a hashing function.

The hashing function may be an eNB specific scheduling algorithm that optimizes scheduling or any other parameter. For example, if the R-PDCCH carries a downlink assignment, to reduce the latency in decoding the data, the hashing function in the donor eNB may map it to a CCE allocated on the first OFDM control symbol. Similarly, if the R-PDCCH carries an UL grant, the donor eNB may map it to a CCE allocated to the second or third OFDM control symbol (this is because the UL transmission, needs to be performed 4 ms later, so the latency in decoding the control channel is not a main concern). The hashing function may be a randomizing function with input parameters selected from the following set: sub-frame number, aggregation level, time slot index, or a relay specific identifier like relay radio network temporary identity (RNTI). For example, CCEs with aggregation level 2 may be mapped to the first OFDM control symbol in even sub-frames, and to the second OFDM control symbol in odd sub-frames. The hashing function may also include multiplexing of candidate R-PDCCHs followed by simple partitioning into units of CCE or similar. Additionally, a modulo rotational shift may be applied where the shift is determined based on some or all of the parameters specified herein.

At block 725, the CCEs for $i^{th}$ OFDM control symbol are multiplexed together and NULL bits are added such that after modulation and-pre-coding, the ith vector fits completely into the $i^{th}$ symbol, where i=1 . . . n. At block 730, the modulated and pre-coded symbols are mapped, in frequency first order over the RBs allocated for backhaul. FIG. 7B shows an example of the embodiment where the mapping is performed over two OFDM symbols and the CCEs may not be mapped across two OFDM symbols. In other words, for example, the first OFDM symbol may comprise one or more whole control channel elements (e.g., CCE #1 and #2) and padding (e.g., N which may be padding) if the insertion of a CCE would go beyond the number of bits available in a OFDM symbol.

FIG. 7C displays what may occur at the receiver, for each OFDM control symbol. At block 782 the RN performs demodulation and at block 784 constructs n vectors of demodulated bits where the length of $i^{th}$ (i=1 . . . n) vector is equal to the number of bits in the ith OFDM control symbol. At block 786 the RN demarcates the $i^{th}$ vector at CCE boundaries and discards NULL bits beyond the integer number of CCEs. At block 788, the RN may perform blind decoding over the CCEs on a per OFDM symbol basis. This is possible since interleaving and CCE randomization may be performed over the span of a single OFDM control symbol. Using a hashing function identical to the eNB, for each aggregation level, the relay may determine the candidate CCEs over which to perform the decoding. If no R-PDCCH addressed to the relay node is found (i.e., No at block 790) and there are more OFDM control symbols (i.e., Yes at block 794), the RN continues to decode over the following vector of demodulated bits. If a R-PDCCH addressed to the relay node is detected (i.e., Yes at block 790), then at block 791 the RN checks if all monitored R-PDCCH (i.e., all monitored RNTIs) were detected. The RN may continue decoding until the required number of R-PDCCH are found (i.e., Yes at block 791) or the maximum number of OFDM control symbols are reached (i.e., No at block 794). The maximum number of OFDM control symbols may be standardized, or tied to other system parameters like bandwidth, or signaled by higher layers.

Figure 8:
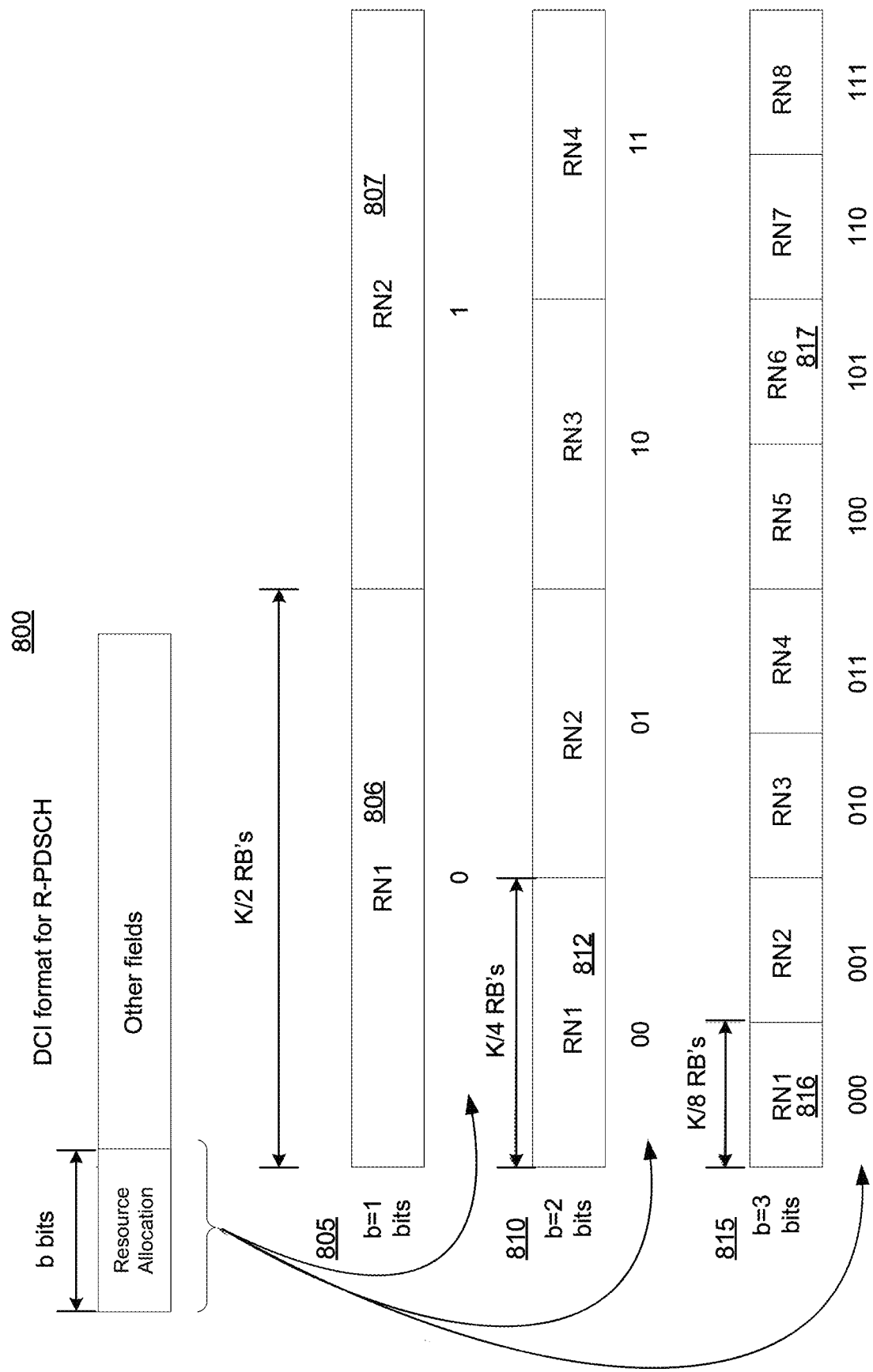
FIG. 8 shows a reduced bit map for resource allocation.

Dedicated RBs may be distributed amongst the RNs in a semi-static function. If there are K RBs allocated for relays in an area, then with b bits, $K/2^b$ RBs may be assigned to $2^b$ relays or $K/2^{b-1}$ RBs to $2^{b-1}$ relays and so on. Both K and b may be known to the relay nodes via higher layer signaling or relay system information. Depending on b, the-DCI format lengths may change, and the relay nodes may perform blind decoding accordingly as shown in FIG. 8, which shows reduced bit map for resource allocation.

With one bit 805, resources may be signaled to two relay nodes. As shown in FIG. 8, RN 1 at 806 may be assigned the first half of total of K RBs and RN 2 at 807 may be assigned the next half. With two bits, 810, resources may be signaled to 4 relay nodes. For example RN1, 812, may be assigned the first K/4 RBs. Similarly, with three bits, equal resources may be assigned to eight relays. As shown in FIG. 8, RN 1 may be assigned the first K/8 RBs by sending '000' as the resource allocation in its grant. RN 6, 817, may be assigned the sixth set of K/8 RBs by sending '101' as the resource allocation in its grant. Alternately, for the example of three bits, if DL backhaul data for less than 8 RN is transmitted in a sub-frame, Relay "X" may be assigned the "Y" sub-set by sending the appropriate 3-bit header. More specifically, if only relays 3, 4, 5, 6, 7, 8 are assigned DL resources, RN 3 may be assigned-sub-set #0 by signaling '000' in the header, RN 4 may be assigned sub-set #1 by signaling '001' in the header and so on. The remaining sub-sets (#6 and #7) may be reused by the donor eNB to schedule DL data for the macro WTRUs. This method may be applied when the RBs dedicated to the R-PDSCH (DL backhaul data) for the relays may be split equally between all the RN connected to the eNB. Although this method has less scheduling granularity in the frequency domain, it has the advantage of low overhead, since it does not require the transmission of the resource allocation bitmap that is employed in resource allocation Type 0 or Type 1. Alternately, if the start of each sub-set is also signaled, then the restriction for equal resource allocation for the RNs may be lifted.

With backhaul a delay may be included between R-PDCCH and R-PDSCH (DL resource) and between R-PDCCH and R-PUSCH (UL grant) where the delay may be equal to or greater than 0 in a unit of subframes. This may allow for R-PDCCH to provide DL assignment or UL grants in later sub-frames(R-PDCCH to R-PDSCH is $\delta_D$ sub-frames ($\delta_D$>1), and R-PDCCH to -PUSCH is $\delta_D$>4). If the R-PDCCH grants uplink resources on the backhaul link in one or more later sub-frames, the RN knows in advance the sub-frames that will be used for UL data backhaul. If the R-PDCCH assigns downlink resources on the backhaul link in one or more later sub-frames, the RN knows in advance what subframes will be needed for UL transmission of the ACK/NACK feedback on the backhaul. The RN may then schedule the R-WTRUs such that collisions between the UL access link, and the UL backhaul are avoided (or minimized). Note that the R-WTRUs are the UEs in the RN cell that may be served by the RN.

In order to make UL/DL scheduling in either the backhaul link or access link more flexible, the eNB may configure the delay ($\delta_D$ or $\delta_U$) for each RN (or a group of RNs) semi-statically or dynamically. In case of semi-static configuration, a value of the delay is signaled to the RN(s) through higher layers. When it is configured dynamically, the value may be included in R-PDCCH by introducing a new DCI format where the value of the delay may be represented by a few bits (e.g., 2 or 3 bits). Alternatively, a delay indicator may be introduced/used in the backhaul control region to indicate a value of $\delta_D$ or $\delta_U$. For instance, when a binary delay indicator for DL resources (e.g., R-PDSCH) is used, "0" represents zero delay (e.g., meaning R-PDSCH in the same subframe as R-PDCCH), while "1" means the presence of DL resources (e.g., RPDSCH) in one (or more) later subframe(s) associated with the current subframe.

The delay $\delta_D$ or $\delta_U$ may be applied, whereby 1) $\delta_D$ or $\delta_U$ corresponds to a delay applied immediately after the sub-frame in which the grant is received or 2) the delay, to reduce the number of bits and allow more flexibility, can be relative to a known baseline sub-frame in the future. For example, in respect with baseline sub-frame, in case of uplink, the delay may be with respect to sub-frame n+4, where n is the sub-frame in which the grant is received. Furthermore, $\delta_D$ or $\delta_U$ may also take negative values which would imply an advancement from the baseline sub-frame.

In the methods described herein, the parameters to configure the relay node may be signaled semi-statically or may be preconfigured. When the relay starts up, it may behave as a regular UE. Any relay specific configuration parameters may be exchanged via radio resource control (RRC) messages. The relay may use this configuration information to transition from its UE identity to the relay identity.

In R8, the A/N for UL transmission is signaled on the DL PHICH channel. For the relay operation, this may not be optimal or even possible. The A/N for relay UL backhaul can be sent via a R-PDCCH. The DCI format carried by the R-PDCCH may be an extension of the relay specific DCI formats to include A/N information. Alternatively, a special DCI format may be created that carries the A/Ns for one or several Relay nodes. This DCI format may be transmitted using an R-PDCCH with a special RNTI that signifies that the DCI format is intended for A/N. Furthermore, in order to serve the higher quality requirements for A/N specific R-PDCCH, such an R-PDCCH; may be encoded with a low coding rate by using a higher aggregation level than the R-PDCCHs used for UL and DL grants. Additionally, in order to reduce the blind decoding complexity, the aggregation level of such a R-PDCCH may be specified in the standards.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor, memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A wireless transmit/receive unit (WTRU) comprising:
a processor configured to at least:
send an uplink transmission based on a resource assignment received from a network;
receive a physical downlink control channel (PDCCH) transmission;
determine that a radio network temporary identifier (RNTI) is associated with the PDCCH transmission;
determine, in accordance with the RNTI being associated with the PDCCH transmission, that a downlink control information (DCI) format associated with the

PDCCH transmission provides feedback information for the uplink transmission; and
determine the feedback information.

2. The WTRU of claim 1, wherein the processor is configured to receive the resource assignment via an uplink grant.

3. The WTRU of claim 1, wherein the resource assignment is associated with physical uplink shared channel (PUSCH) resources used for sending the uplink transmission.

4. The WTRU of claim 3, wherein the PUSCH resources used for sending the uplink transmission are assigned dynamically or semi-statically.

5. The WTRU of claim 1, wherein the RNTI is a special wherein at least the RNTI indicates that the DCI format carries the feedback information associated with the uplink transmission.

6. The WTRU of claim 5, wherein the PDCCH transmission is scrambled with the special RNTI.

7. The WTRU of claim 1, wherein the feedback information comprises an acknowledgement (ACK) or a negative acknowledgement (NACK).

8. The WTRU of claim 1, wherein the feedback information for the uplink transmission is carried by the PDCCH transmission.

9. A method implemented in a wireless transmit/receive unit (WTRU), the method comprising:
sending an uplink transmission based on a resource assignment received from a network;
receiving a physical downlink control channel (PDCCH) transmission;
determining that a radio network temporary identifier (RNTI) is associated with the PDCCH transmission;
determining, in accordance with the RNTI being associated with the PDCCH transmission, that a downlink control information (DCI) format associated with the PDCCH transmission provides feedback information for the uplink transmission; and
determining the feedback information.

10. The method of claim 9, comprising receiving the resource assignment via an uplink grant.

11. The method of claim 9, wherein the resource assignment is associated with physical uplink shared channel (PUSCH) resources used for sending the uplink transmission.

12. The method of claim 11, wherein the PUSCH resources used for sending the uplink transmission are assigned dynamically or semi-statically.

13. The method of claim 9, wherein the RNTI is a special RNTI, wherein at least the RNTI indicates that the DCI format carries the feedback information associated with the uplink transmission.

14. The method of claim 13, wherein the PDCCH transmission is scrambled with the special RNTI.

15. The method of claim 9, wherein the feedback information comprises an acknowledgement (ACK) or a negative acknowledgement (NACK).

16. The method of claim 9, wherein the feedback information for the uplink transmission is carried by the PDCCH transmission.

* * * * *